May 24, 1932.     A. WYZENBEEK     1,860,163

VALVE ASSEMBLY FOR AIR COMPRESSING CYLINDERS

Filed April 21, 1930

Inventor:
Andrew Wyzenbeek
by Albert Scheibh
Attorney

Patented May 24, 1932

1,860,163

UNITED STATES PATENT OFFICE

ANDREW WYZENBEEK, OF CHICAGO, ILLINOIS, ASSIGNOR TO BINKS MANUFACTURING CO., OF CHICAGO, ILLINOIS, A CORPORATION OF DELAWARE

VALVE ASSEMBLY FOR AIR-COMPRESSING CYLINDERS

Application filed April 21, 1930. Serial No. 446,037.

My invention relates to a unitary valve assembly for controlling both the intake of air to an air-compressing cylinder, and the duct through which the compressed air is supplied by the cylinder.

In some of its general objects, my invention aims to provide a simple and inexpensive valve assembly for this purpose, which can readily be attached as a unit to a single perforated end portion of an air compressing cylinder, which will afford air passages of large area in proportion to the size of the valve assembly, which will require only simple machining for the manufacture of its parts, and which can easily be disassembled and reassembled.

Furthermore, my invention aims to provide a valve assembly of this class which will have no slidably interfitting parts, which will be free of auxiliary spring members; which can readily be constructed in a size suitable for attaching the valve assembly to a gasoline engine cylinder in substitution for the spark plug associated with that cylinder, so as to convert a given cylinder of an engine into an air compressor; and will be substantially self-cleaning.

Still further and also more detailed objects will appear from the following specification, and from the accompanying drawings, in which drawings Fig. 1 is an elevation of a valve assembly embodying my invention.

Figure 1:
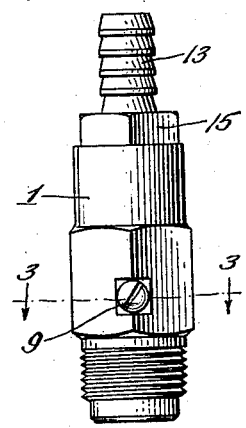

In the illustrated embodiment, my valve assembly includes an upright tubular body 1 threaded at its lower end to fit a bore 2 in a cylinder head 3. This body has a portion of its bore contracted, at a distance from both ends of the body, by an annular contraction 4, thereby dividing the body bore into upper and lower bore portions or chambers A and B connected by a connecting port C of somewhat smaller diameter.

Leading into the lower chamber B and desirably near the bore contraction 4 are two inlet ports 5, which ports desirably have a joint area at least equal to the cross-sectional area of the lower bore portion B. These two ports preferably have a common axis D diametric of the body portion, and the part of the body 1 through which the two ports extend is preferably of a polygonal cross-section (such as hexagonal) which will present parallel exterior faces at the outer ends of the two ports, so that both ports can easily be drilled in one operation.

The body member also has a transverse bore 8 extending through one side of the body to the bore portion B; desirably at right angles to the axis D of the said ports, and radially of the said bore portion and with the axis of the transverse bore in the same plane with the axes of both ports.

Inserted within the lower bore portion B is an inlet valve member 6 consisting of a centrally perforated strip of metal wider than each of the inlet ports 5 and of less initial length than the inner periphery of the bore portion B, this strip being initially formed into an incomplete tube of larger exterior radius than the said bore portion B. This entire bore portion is desirably of a smooth cylindrical formation, so that the valve member 6 can easily be slid up into the bore portion B and turned so that the medial perforation 7 in this member is uniformly spaced from the nearer edges of the two inlet ports 5, and so as to aline this perforation 7 with the transverse bore 8 in the valve body.

A screw 9 is then slid through the transverse bore 8 and the perforation 7, and this screw is threaded into a bar 10 which extends longitudinally of the body within the bore portion B, so that this bar will clamp the medial part of the inlet valve member 6 against a part of the bore portion B which is midway between the two inlet ports 5 circumferentially of the valve body 1. With the valve member 6 thus disposed, and with this metal strip of such a length (as shown in full lines in Fig. 3) as to extend past the transverse bore 8 and both of the ports, the valve member 6 normally closes both of the inlet ports, as shown in full lines in Fig. 3. However, the strip from which the valve member 6 was formed is of sufficiently less length than the complete interior periphery of the bore portion B, so that the two wings (or portions of this member at opposite sides of the clamping bar 10) can flex considerably toward each other (as shown in dotted lines in Fig. 3) when these wings are pressed toward each other.

Figure 2:
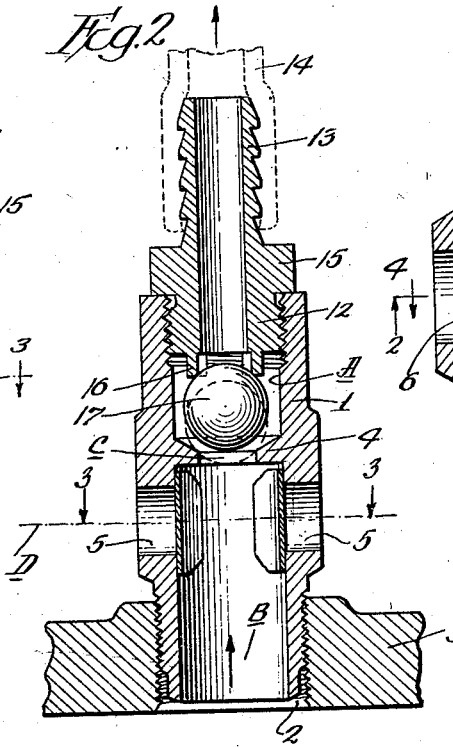
Fig. 2 is an enlarged central and longitudinal section through the same valve assembly, including a section through the portion of a cylinder head to which this assembly is attached, showing the movable valve parts as they appear while compressed air is being discharged from the cylinder to an air hose.
Figure 5:
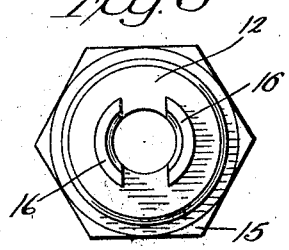
Fig. 5 is an enlarged bottom view of the hose-attaching nipple which forms part of my valve assembly.
Figure 6:
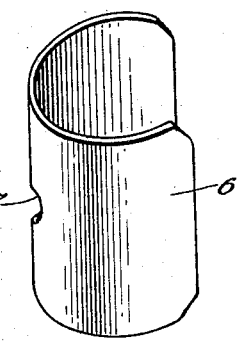
Fig. 6 is an enlarged perspective view of the inlet-controlling valve members, showing this as it appears when expanded in diameter by its own resiliency, before this valve member is inserted in the valve body.

Threaded into the upper or outward end of the valve body is the lower or inward portion 12 of a hose nipple which desirably has its outer end portion 13 corrugated for secure attaching to an air hose 14, and desirably has between its said two end portions a radial flange 15 adapted to seat on the upper or outward end of the valve body 1. The lower end of the hose nipple is formed to afford symmetrically disposed downward projections 16 spaced from each other and from the outward bore portion A, which projections are here shown (Figs. 2 and 5) as symmetrical portions of a tubular downward extension on the nipple.

Interposed between these nipple projections 16 and the annular bore contraction 4 is a valve ball or air check ball 17, desirably of metal, which valve ball is of larger diameter than the bore of the said contraction 4 (or diameter of the connecting port C), but considerably smaller than either the diameter of the upper bore portion A (in which this ball is disposed) or the distance between the projections 16 and the said bore contraction.

Figure 3:
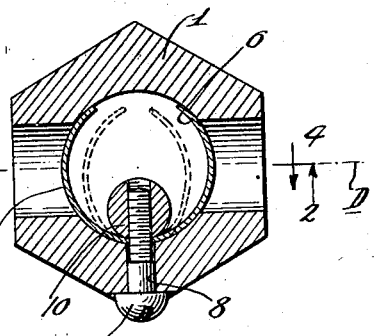
Fig. 3 is a transverse section taken along the line 3—3 of Fig. 2, but drawn on a still larger scale, with dotted lines showing the positions of air-inlet-controlling valve wings during the intake of air to the cylinder.
Figure 4:
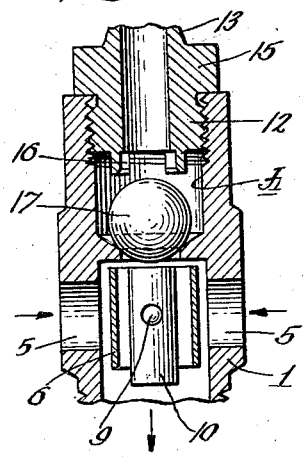
Fig. 4 is a fragmentary central and longitudinal section taken along the line 4—4 of Fig. 3 in the opposite direction from the section of Fig. 2 and drawn on the same scale as Fig. 2, showing the position of the movable valve parts as they appear during the intake of air to the cylinder.

With a thus constructed valve assembly attached to the upper head end of the cylinder of a single-acting compressor in which the compression is effected by the upward stroke of the piston, the action is as follows:

When the piston is not actuated (as when the engine is standing still), the two symmetrical wings of the inlet valve member 6 (or portions of that member at opposite sides of the clamping bar 10) are pressed by the inherent resiliency of that member against the bore portion B in which this member is disposed, and extend across the inner ends of the inlet ports 5, as shown in Fig. 3.

Consequently, these inlet ports are closed against the admission of both air and dust. At the same time, the valve vall 17 is seated by gravity on the annular contraction 4 and disconnects both the lower chamber B and the compressor cylinder from the hose, so that compressed air in the hose or any appliance connected to this hose will not return to the cylinder. To facilitate this seating of the ball 17, the upper face of the annular contraction or valve seat 4 desirably tapers downwardly inward, as in Fig. 2.

During the downstroke of the piston in the air compressing cylinder, the partial vacuum created above the piston will cause the outer air to flex the two wings of the valve member 6 inwardly, after the manner shown in dotted lines in Fig. 3, thereby admitting air between these wings and the bore of the lower chamber B and into the cylinder. The check ball 17 remains seated (by gravity) on the annular bore contraction, and any compressed air above it will only press this ball all the more firmly against the said contraction, so that no air will be sucked back through the hose.

During the return or upward stroke of the piston, the air compressed in the cylinder is forced upward into the lower chamber B and presses the wings of the inlet valve member 6 tightly against the bore of this chamber, thereby tightly closing the ports 5. The air pressure in this chamber also lifts the check ball 17 off the annular contraction (or valve seat) 4 and holds the ball up against the projections 16 on the nipple, while the compressed air passes through the spaces between these projections into the bore of the nipple and on to the air hose 14.

In practice, the clamping member 10 is desirably a piece of metal rod of considerably smaller diameter than the lower bore B, and of such cross-section as to present a convex surface on which the inlet valve member will flex freely. This clamping bar also preferably is at least as long as the height of the inlet valve member 6, so as to distribute the clamping strain over the entire height of that member. Both this inlet valve member 6 and the check ball 16 are desirably of steel plated with nickel or other non-corrosive metal, while brass or the like suffices for the valve body and the nipple.

With the parts of my valve assembly thus arranged and proportioned, it will readily be seen from the drawings that I can secure a speedy and ample admission of air to the cylinder without any considerable throttling of the air while passing through the valve body, and that I also can secure a speedy and firm closing of each of the intake ports 5 during the upstroke of the piston in the cylinder, while employing a valve body having its main bore portions A and B of relatively large diameter in proportion to the outside diameter of this body. This not only enables me to reduce the cost greatly over the heretofore employed bulky valve assemblies, but also permits me to provide an efficient and durable valve assembly of this class in a size which will correspond both in general dimensions and in its threaded connecting end to the spark plugs commonly employed on automobile engines.

Moreover, since my entire valve unit comprices only six easily assembled parts, none of which need to be machined to a slidable interfitting, the manufacturing cost is quite low.

However, while I have heretofore described my invention in an embodiment including numerous desirable details of construction and arrangement, I do not wish to be limited in these respects, since many changes might be made without departing either from the spirit of my invention or from the appended claims. Nor do I wish to be limited to the use of my valve assembly in connection with cylinders or engines initially designed for power-producing purposes, although my said assembly is particularly suited for use in the speedy conversion of such an engine cylinder into an air compressor actuated by the pistons in other cylinders of the same engine.

I claim as my invention:

1. A valve for an air compressing cylinder, comprising: an upright tubular valve body provided intermediate its ends with two lateral inlet ports spaced circumferentially of the body, the body having an annular flange within its bore above the ports; a nipple attached to the upper end of the body and presenting downwardly directed projections above the top of the said flange; a check valve member adapted to seat by gravity upon the said flange to close the bore of the flange and spaced downwardly from the projections when thus seated; and an inlet valve member housed by the bore of the body below the said flange and presenting two resilient wings respectively controlling the lateral inlet openings, each wing being normally curved by its own resiliency against the said bore and extending across the inner end of one of the inlet openings, and each wing being adapted to be flexed away from the adjacent inlet opening.

2. A valve for an air compressing cylinder, comprising; an upright tubular valve body provided intermediate its ends with two lateral inlet ports spaced circumferentially of the body, the bore of the body having an interior annular flange above the said inlet openings; a nipple attached to the body and presenting downwardly directed projections above the top of the said flange; and a single resilient member fastened to the valve body and disposed within the bore of that body and controlling the admission of air through both of the inlet ports.

3. A valve as per claim 2, in which the surface presented to the strip by the clamping member is convexed and of smaller radius than the portion of the bore housing the strip.

Signed at Chicago, Illinois, April 18th, 1930.

ANDREW WYZENBEEK.